United States Patent [19]

Massaloux

[11] Patent Number: 5,812,965
[45] Date of Patent: Sep. 22, 1998

[54] PROCESS AND DEVICE FOR CREATING COMFORT NOISE IN A DIGITAL SPEECH TRANSMISSION SYSTEM

[75] Inventor: Dominique Massaloux, Perros-Guirec, France

[73] Assignee: France Telecom, France

[21] Appl. No.: 731,381

[22] Filed: Oct. 11, 1996

[30] Foreign Application Priority Data

Oct. 13, 1995 [FR] France .................................. 95 12039

[51] Int. Cl.⁶ .............................. G10L 3/02; G10L 9/00
[52] U.S. Cl. .......................................... 704/205; 704/228
[58] Field of Search .................................. 704/205, 226, 704/227, 228, 219, 201, 214, 220

[56] References Cited

U.S. PATENT DOCUMENTS

| 5,276,765 | 1/1994 | Freeman et al. | 704/233 |
| 5,475,712 | 12/1995 | Sasaki | 375/241 |
| 5,537,509 | 7/1996 | Swaminathan et al. | 704/228 |
| 5,539,858 | 7/1996 | Sasaki et al. | 704/226 |
| 5,553,192 | 9/1996 | Hayata | 704/228 |

FOREIGN PATENT DOCUMENTS

| 0 335 521 | 10/1989 | European Pat. Off. | G10L 3/00 |
| 0 593 255 | 4/1994 | European Pat. Off. | G10L 5/00 |

OTHER PUBLICATIONS

Freeman et al., "The Voice Activity Detector for the Pan–European Digital Cellular Mobile Telephone Service"I–CASSP '89 :Acoustics, &Signal Processing Conference Processing Conference pp. 369–372.

C B Southcott et al. "Voice Control of the Pan–European Digital Mobile Radio System", Nov., 1989, IEEE, USA, pp. 1070–1074, vol. 2.

C B Southcott, "Speech Processing in the Pan–European Digital Cellular Mobile Telephone System", Dec., 1998, IEE, UK, pp. 5/1–5.

Andrew DeJaco et al., "QCELP: The North American CDMA Digital Cellular Variable Rate Speech Coding Standard", Proc. IEEE, Workshop on Speech Coding for Telecomm, Quebec, Oct. 1993, pp. 5–6.

Antony Crossman, "A High Performance Audio Codec For Videoconferencing", ICSPAT, Santa Clara, Oct. 93, pp. 1039–1042.

*Primary Examiner*—David R. Hudspeth
*Assistant Examiner*—Patrick N. Edouard
*Attorney, Agent, or Firm*—Evenson, McKeown, Edwards & Lenahan, P.L.L.C.

[57] ABSTRACT

A process and a device for creating comfort noise for discontinuous speech transmission in which, following the end of each detected active period, a silence descriptor frame is generated as a set of parameters describing the comfort noise. For every successive current inactive frame, the frequency spectrum is analysed and then compared with a reference spectrum stored previously. Upon identity of the reference frequency spectrum and the current frame spectrum, no new silence descriptor frame is transmitted. Upon absence of identity of these spectra, a new silence descriptor frame is transmitted.

11 Claims, 7 Drawing Sheets

CNG DIAGRAM - RECEPTION PART

OVERALL CNG-DEC OPERATION
FOR VAD = 0 OR 2

PROCESS AND DEVICE FOR CREATING COMFORT NOISE IN A DIGITAL SPEECH TRANSMISSION SYSTEM

The invention relates to a process and a device for creating comfort noise in a system for the digital transmission of discontinuous speech.

In general, systems for the transmission of discontinuous speech include a voice activity module making it possible to deliver a cue relating to the presence or absence of the speech signal. The speech signal, delivered by the aforesaid systems, thus comprises the aforesaid speech signal proper followed and/or preceded by silences. When a silence or inactivity is detected, the transmission system is commanded in such a way as either to reduce the signal rate transmitted or simply to cut off the transmission.

When the ambient noise of the communication is high, the sudden suppression or modification of the characteristics thereof, during the inactive periods, engenders an effect which is extremely unpleasant for the listener, this effect possibly causing an impression of the breaking of the communication. Furthermore, the speech signal sometimes reaches the limits of intelligibility.

To remedy the aforesaid drawbacks, it has been proposed, more recently, to insert during the nonactive periods, a synthetic signal reproducing the background noise present before the interruption of the transmission. By way of example the work carried out in the context of drawing up the specifications for the full-rate and half-rate European mobile radio system may be cited. The full-rate European mobile radio system has formed the subject of Recommendation ETSI GSM 06.12. This system comprises a comfort noise generator device CNG. It furthermore comprises a speech coder producing parameter frames coded over 260 bits, every 20 ms. A voice activity detector delivers at each frame a cue relating to the active or inactive character of the frame. The amplitude parameters of the excitation blocks and Log Area Ratios (LAR) emanating from the LPC analysis of the coder supply cues relating to the level or amplitude and the envelope of the frequency spectrum (LAR) of the ambient noise. The comfort noise generator averages these parameters over a specified number of consecutive frames, quantizes them according to the quantization procedure used by the speech coder and generates a silence descriptor frame, SID frame (Silence Inscription Descriptor). Such a frame is generated at the end of an active period and every 480 ms of each inactive period. The SID frames are coded, furnished with an SID codeword ensuring the marking of these frames, and then transmitted for reception by a decoder. The comfort noise is synthesized at the decoder by randomly drawing the codes of the parameters of the excitation, zeroing the gain code of the long-term predictor, replacing the codes corresponding to the LPC analysis and to the amplitude of the excitation blocks by codes of the SID frame. The decoding of the inactive frames is next performed like that of the speech frames. In such a device, the modules of the comfort noise generator are external to the speech coder and to the decoder, this having the advantage of greater modularity of the system at the cost of increasing the complexity of the processing of the inactive frames: the computing of the SID frames at the coder and the random formation of the codes of the excitation are added to the normal processing of the speech frames. Furthermore, the local decoder of the speech coder, at the sending end, and the distant decoder, at the receiving end, are no longer synchronous after an inactive period since the operation of the coder is independent of the system. The half-rate European mobile radio system also has a comfort noise generator with a similar structure to that of the full-rate system, see Recommendation ETSI GSM 06.22 and GSM 06.20. In a manner equivalent to the procedure implemented by the CNG generator of the full-rate system, the CNG generator uses the autocorrelations of the speech signal, input signal, over 8 successive frames to evaluate the spectrum of the ambient noise. As regards the energy, it takes into account the energy of these 8 frames and quantizes the parameter of the ratio of the estimated energy to the actual energy, the parameter GS, see Recommendation ETSI GSM 06.20. Furthermore, the speech coder has been adapted so as to operate during the inactive periods, synchronously with the distant decoder, the random generator being reinitialized at each start of the inactive zone.

Finally, systems implementing multi-rate coders have been proposed, whose operation within a particular mode of working is akin to that of a CNG. Among them may be cited the multi-rate coder described by the article published by A. De JACO, W. GARDNER, P. JACOBS and CHONG LEE, entitled *"QCELP: The North American CDMA Digital Cellular Variable Speech Coding Standard"*, Proc. IEEE Workshop on Speech Coding for Telecomm, Quebec, Oct. 1993, pp. 5–6. In such a system, a voice activity detector type device determines the necessary rate for the transmission. Four rates are possible, 1, ½, ¼ or ⅛ bits per sample. Transmission in not interrupted and the parameters transmitted are the envelope of the spectrum via the LPC coefficients and an indication relating to the excitation energy. These parameters are transmitted at each frame and the system with the lowest rate exhibits a function similar to that of a CNG generator.

Furthermore, the system described by A. GROSSMAN in the publication entitled *"A High performance Audio Codec for Videoconferencing"* ICSPAT, Santa Clara, Oct. 93, pp. 1039–1042 may also be cited. In such a variable-rate, broadband system, a procedure for replacing the transformed coefficients by noise codes is used. However, the spectral envelope of the signal is again also transmitted, inter-frame smoothing being performed.

The process and the device for creating comfort noise in a system for the digital transmission of speech, according to the present invention, have the aim of achieving a level of quality of synthesis comparable with that of the high-rate systems while allowing transmission rates comparable with those of systems with a highly reduced rate.

Another aim of the present invention is furthermore the creation of comfort noise of good quality, representing the ambient medium while minimizing the volume and the rate of data to be transmitted in order to ensure this creation.

The process and the device for creating comfort noise in a system for the digital transmission of discontinuous speech, in which the coded speech signal is transmitted during an active period, during which active frames are transmitted, each active period being followed by an inactive period, during which at least inactive frames are transmitted, which are the subjects of the present invention, are noteworthy in that they consist in, respectively provide for, at the sending end, on detecting an inactive period:

generating and transmitting a silence descriptor frame, consisting of a set of coded parameters describing the comfort noise, this silence descriptor frame constituting the first silence descriptor frame of the inactive period following this active period; and for every successive current inactive frame of this inactive period:

analysing and storing the frequency spectrum of this current inactive frame;

comparing the frequency spectrum of this current inactive frame with a reference frequency spectrum, and upon criterion of identity of the reference and current frame frequency spectra:

deferring any transmission, especially that of a new silence descriptor frame during this current inactive frame, and upon criterion of absence of identity of the reference and current frame frequency spectra:

generating and transmitting a new silence descriptor frame during this current inactive frame, this making it possible to reduce the transmission rate of the comfort noise to that of merely the silence descriptor frames whose frequency spectrum is different from the reference spectrum estimated during the preceding silence descriptor frame.

The process and the device, which are the subjects of the present invention are likewise noteworthy in that they consist in, respectively provide for, at the receiving end, in conjunction with a speech decoder:

decoding, for each successive silence descriptor frame, the sot of coded parameters describing the comfort noise, in order to generate decoded parameters;

synthesizing, at the level of the speech decoder, after processing the decoded parameters, the corresponding comfort noise.

They will be better understood on reading the description and looking at the drawings below, in which, apart from FIG. 1 relating to the prior art:

FIG. 3b represents a detail of an embodiment of a comfort noise generator implemented in the device represented in FIG. 3a;

FIG. 4b represents a detail of an embodiment of a comfort noise generator implemented in the device represented in FIG. 4a.

A more detailed description of the process for creating comfort noise which is the subject of the present invention will now be given in connection with the previously mentioned figures.

Figure 1:
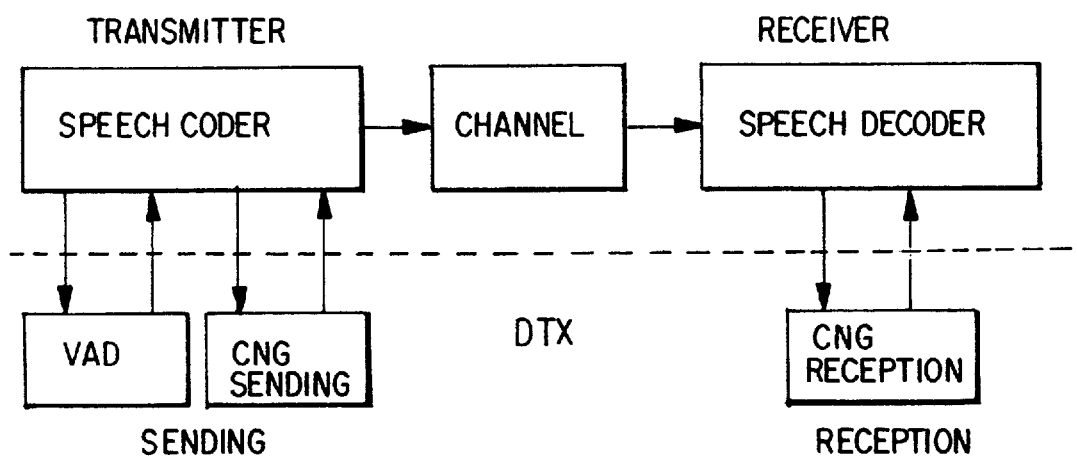

Firstly, and prior to describing the process proper, it will be recalled, in connection with FIG. 1 relating to the prior art, that a device for creating conventional comfort noise in a system for the digital transmission of speech includes, at the sending end, in addition to a speech coder, a voice activity detector, denoted VAD, and a generator CNG. This assembly makes it possible, at the sending end, to transmit periodically silence descriptor frames or SID frames, according to one of the methods described earlier in the description over a transmission channel proper.

At the receiving end, a speech decoder, a decoder of predictive type when the speech coder used at the sending end is also a coder of predictive type, makes it possible to decode the speech signals when they are transmitted, respectively the SID frames and to create by virtue of a CNG generator at the receiving end corresponding comfort noise.

Figure 2A:
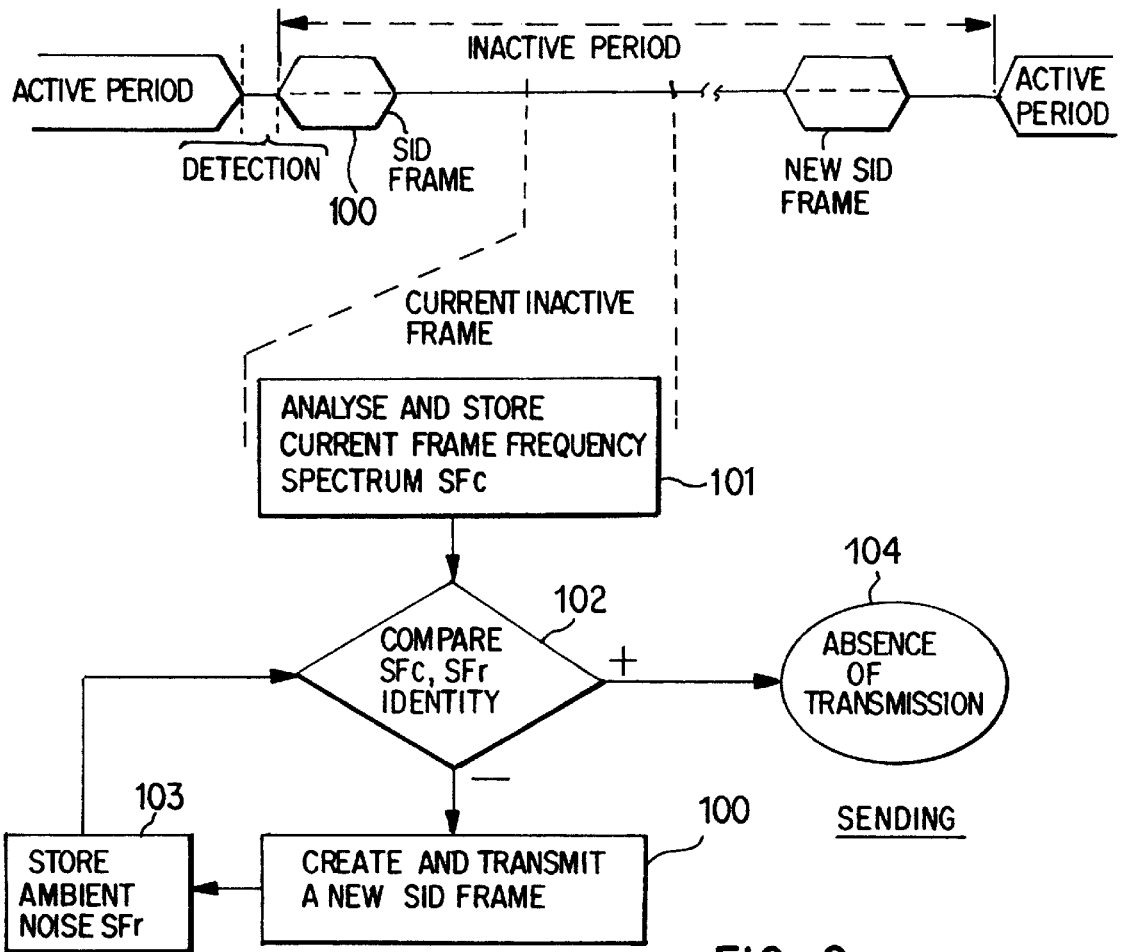
FIG. 2a represents, illustratively, the succession of the essential steps allowing the implementation of the process for creating comfort noise, at the sending end, in accordance with the subject of the present invention.

Thus, as represented furthermore in FIG. 2a, the digital transmission of speech is carried out in discontinuous mode, this transmission therefore consisting of successive active periods in the course of which coded speech signal frames are transmitted, intercut with inactive periods in the course of which no speech signal frame is transmitted. The respective duration of these periods is arbitrary by reason of the asynchronous character of the transmission.

Thus, as will be observed furthermore in the aforesaid FIG. 2a, the process for creating comfort noise, which is the subject of the present invention, is implemented at the sending end, following the detection of an inactive period. The detection of an inactive period can for example be carried out on the basis of the signal delivered by a voice activity detector VAD, to which a time delay is applied, so as to ensure effective passage to an inactive period. This time delay can also be adjusted so as to take account of the duration of the detection period, represented in FIG. 2a, so as to ensure correct implementation of the process according to the invention. In the aforesaid FIG. 2a, the detection period is represented by an interval delimited by dashed lines following the relevant active period.

Following the detection of each inactive period, the process which is the subject of the present invention consists in generating and transmitting, in step 100 of FIG. 2a, after the end of the aforesaid detection period, an SID or silence descriptor frame. This silence descriptor frame consists of a set of coded parameters describing the comfort noise. This silence descriptor frame in fact constitutes the first inactive frame of the inactive period following the active period and the detection period which were mentioned above.

Thus, as will be observed furthermore in FIG. 2a, the process which is the subject of the present invention next consists, for every successive current inactive frame of this inactive period, in analysing and storing, in a step 101, the frequency spectrum of this relevant current inactive frame. The frequency spectrum of the aforesaid current inactive frame is then compared, in a step 102, with a reference frequency spectrum, the obtaining of which will be described later in the description.

Upon criterion of identity of the reference and current frame frequency spectra, as represented in the aforesaid step 102, the process according to the invention consists then, either in deferring any transmission, especially that of a new silence descriptor frame, SID frame, or upon criterion of absence of identity of the reference and current frame frequency spectra, in generating and transmitting, in a step 100, this step 100 being carried out, for each SID frame, according to the same technique used for the first SID frame, a new silence descriptor frame during this current inactive frame. In FIG. 2a, it is indicated that the deferment of transmission of any new frame, upon criterion of identity of the reference and current frame frequency spectra, bears the reference 104.

Generally, it is indicated that the process which is the subject of the present invention makes it possible to reduce the transmission rate of the comfort noise to that of merely the silence descriptor frames whose frequency spectrum is different from that of the preceding silence descriptor frame.

In a particular embodiment of the process for creating comfort noise, which is the subject of the present invention, it is indicated that the reference frequency spectrum can be formed from the frequency spectrum of the ambient noise obtained during the creation of each silence descriptor frame. Thus, it is understood that the process which is the subject of the present invention, such as represented in FIG. 2a, can include a step 103 of storing the ambient noise making it possible to obtain the reference frequency spectrum for each SID frame.

As regards the initialization of the process which is the subject of the present invention, it is indicated that for the first inactive frame of an inactive period, the use of the reference spectrum is pointless since the send decision for a silence descriptor frame does not rely in this case on comparing the frequency spectrum of the current frame and the reference spectrum. During this first SID frame, this reference spectrum Sfr is either estimated or, advantageously, obtained directly from the reference spectrum calculated in order to devise the SID frame, and stored for the processing of the succeeding inactive frames. This reference spectrum is refreshed with each now silence descriptor frame sent, according to the same method as that used to initialize it at the first SID frame of an inactive period.

The estimation of the frequency spectrum calculated for each SID frame and which can also constitute the reference frequency spectrum can be performed according to the preferred embodiment which will now be described in connection with FIG. 2b.

Figure 2B:
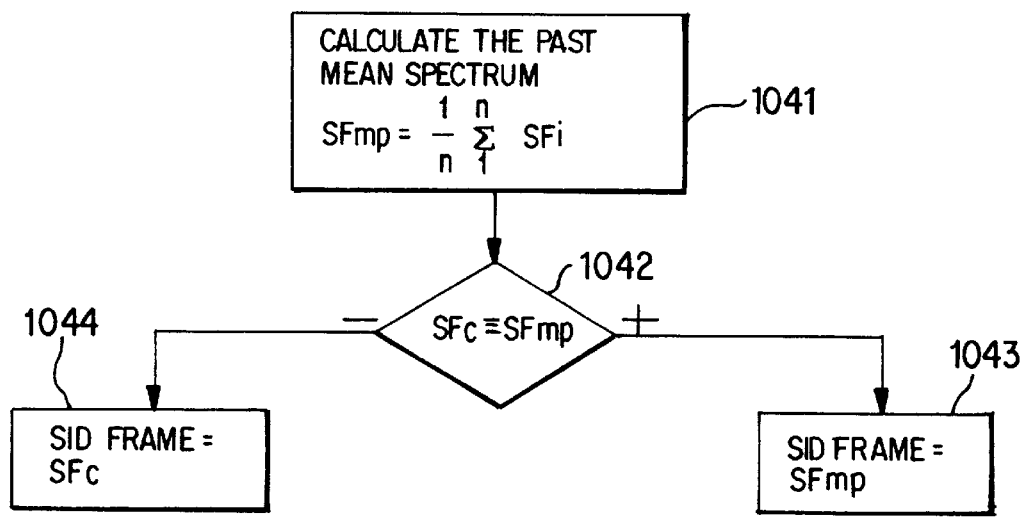
FIG. 2b represents, in flowchart form, a preferred mode of creating silence descriptor frames.

In the embodiment of FIG. 2b, the process which is the subject of the present invention consists in establishing each silence descriptor frame, SID frame, according to a particular procedure making it possible, as it were, to adapt each SID frame to alterations in the ambient noise, and therefore to take into account, when creating the spectrum of the SID frame, certain specific elements of these alterations.

Thus, as has been represented in FIG. 2b, the procedure for establishing each silence descriptor frame can comprise the stop consisting in determining the mean frequency spectrum of the successive inactive frames in order to establish a past moan frequency spectrum, denoted SFmp, this step bearing the reference 1041 in FIG. 2b.

In this case, the past mean frequency spectrum Smp satisfies the relation (1):

$$SFmp = 1/n \sum_{1}^{n} SFi$$

In this relation, it is indicated that, for a plurality of inactive successive frames, denoted SF1, SFi, SFn, previous to the current inactive frame whose frequency spectrum is denoted SFc, the past mean frequency spectrum corresponds to the arithmetic mean over the n frequency spectra of the n successive inactive frames.

The creation proper of the SID frame is then carried out in the following step 1042.

The aforesaid stop 1042 consists in a test of identity of the past mean frequency spectrum and of the frequency spectrum of the current inactive frame symbolized by the relation (2): SFc≡Smp.

It is indicated that the identity criterion does not correspond to strict identity of the frequency spectra compared, it being possible to establish a law or criterion of correspondence. This step in fact makes it possible to carry out a measurement of local stationarity of the frequency spectrum.

Upon criterion of identity of the aforesaid frequency spectra, the process which is the subject of the present invention then consists in selecting 1043 as silence descriptor frame SID the past mean spectrum SFmp, and, upon absence of identity of the aforesaid frequency spectra, in a step 1044, the frequency spectrum of the corresponding current inactive frame.

This mode of working then makes it possible, in a particularly advantageous manner, to estimate the silence spectrum of every current inactive frame according as such a frame belongs either to a locally stationary spectral zone or to a nonstationary spectral zone.

Of course, the number n of successive inactive frames over which the calculation of the past mean spectrum is arbitrary, the latter can for example be taken equal so as to obtain a corresponding time interval of the order of 100 ms. It is indicated furthermore that the silence descriptor frame SID thus constituted is subjected to quantization prior to its transmission.

A more detailed description of the process for creating comfort noise in a system for the digital transmission of discontinuous speech, in accordance with the subject of the present invention, will now be given, at the receiving end, in connection with FIG. 2c.

Of course, it is indicated that, at the receiving end, the process according to the invention involves the sending of the SID frames according to the process described previously.

Figure 2C:
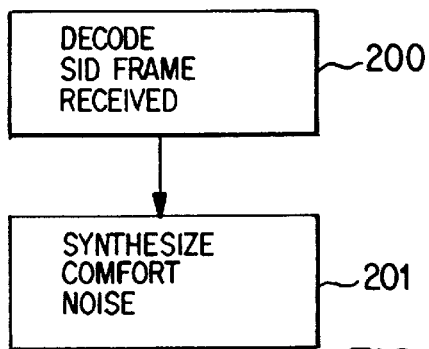
FIG. 2c represents, illustratively, the succession of the essential steps allowing the implementation of the process for creating comfort noise, at the receiving end, in accordance with the subject of the present invention.

With reference to FIG. 2c, it is indicated that the process according to the invention consists then in decoding, for each successive silence descriptor frame, the set of coded parameters describing the comfort noise, in order to generate decoded parameters, in a step 200, and in then synthesizing at the level of the speech decoder, after processing the decoded parameters, the parameters making it possible for the speech decoder to synthesize corresponding comfort noise, in a step 201. It is indicated in particular that the processing of the decoded parameters can consist in a suitable specific recoding.

Generally, it is indicated that the process for creating the comfort noise, which is the subject of the present invention, can advantageously be implemented when the speech coder and the speech decoder which are used at the sending end, respectively at the receiving end, are of predictive type.

In such a case, the decoded signal is obtained by filtering an excitation signal, this signal originating from innovation dictionaries plus optionally from a long-term excitation, by an LPC synthesis filter designated hereafter as LPC filter.

The process which is the subject of the present invention can then consist in generating an excitation signal whose spectrum has characteristics similar to those of white noise in order to excite an LPC filter making it possible in fact to perform the synthesis of the signal in order to produce the comfort noise.

In such a case, the parameters representing the spectrum of the ambient noise are then given by the coefficients of the LPC filter, for the envelope of the spectrum, and by the energy of the excitation signal for the level of the aforesaid spectrum.

The process which is the subject of the present invention, at the sending end, reuses the essential steps already described in connection with FIG. 2a.

Figure 2D:
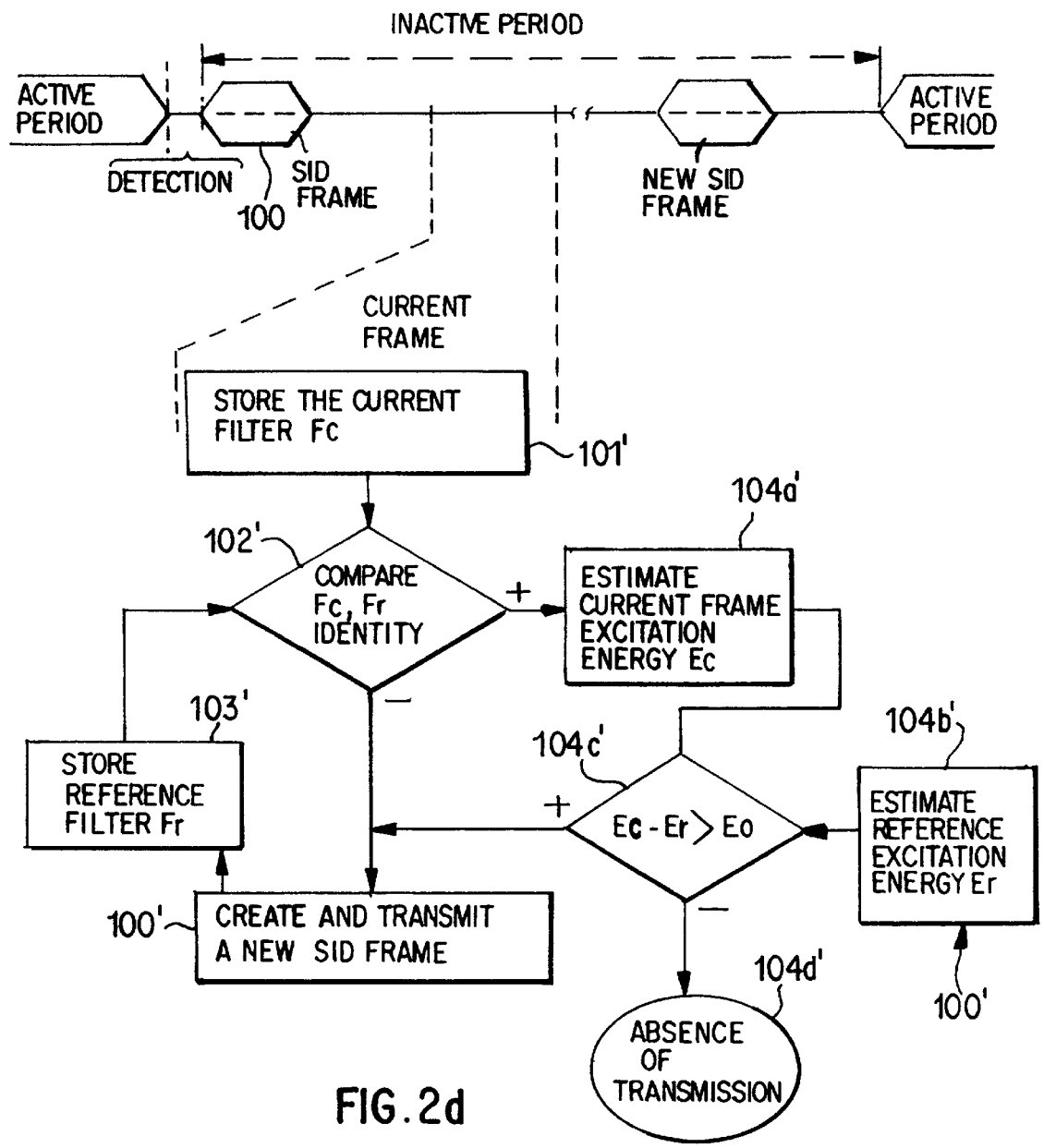
FIG. 2d represents, illustratively, the succession of the essential steps allowing the implementation of the process for creating comfort noise, in the case in which the speech coder is of predictive type implementing an LPC filter.

Such a process is described and represented in connection with FIG. 2d, the same steps including the same references assigned an index ' as regards the operations relating to the transmission of a silence descriptor frame.

In accordance with the particular mode of implementation of the process according to the invention represented in FIG. 2d, it is noted that the process implemented then bases the decision to transmit an SID frame or not to transmit such a frame on the stationarity character of the LPC filter on the one hand, and, on the other hand, on the stationarity character of the excitation energy.

Thus, following the transmission of the first SID frame in step 100', the process such as implemented and described in FIG. 2d, consists in comparing the LPC filter of the current frame, denoted Fc, by storing at 101' the current filter Fc, and then comparing at 102' the current filter Fc with the reference filter Fr obtained and stored during the preceding SID frame according to step 103'.

Upon absence of identity of the aforesaid filters in step 102', a now SID frame is transmitted in stop 1001. Steps 100', 101', 102' and 103' are substantially unchanged with respect to steps 100, 101, 102 and 103 of FIG. 2a.

If, on the contrary, the filters Fc relating to the current filters and Fr relating to the reference filters are identical, the process implemented represented in FIG. 2d consists then in estimating the excitation energy of the current frame Ec, in a step 104'a, and in comparing, in a step 104'c, the aforesaid excitation energy Ec of the current frame with the reference energy Er estimated during the preceding SID frame. This estimation is represented as a step 104'b in FIG. 2d.

In the case in which, in response to the test of step 104'c, the comparison of the excitation energy of the current frame with that of the reference energy is significant, this comparison possibly consisting in a comparison of the difference of these energies relative to a threshold value $E_0$, the process consists then in creating and transmitting a new SID frame by returning to stop 100' described earlier. If, on the contrary, in response to the test of stop 104'c, the difference between the aforesaid excitation energies is not significant, the process then consists in deferring any transmission of a frame at step 104'd similar to step 104d of FIG. 2a.

In the context of the implementation of the process which is the subject of the present invention such as represented in FIG. 2d, it is indicated that, to effect comparison of the LPC filters, it is possible to use distance criteria implemented especially by the vector methods for quantizing LPC filters. The aforesaid distances can consist of the ITAKURA-SAITO distance, that of the maximum likelihood, or euclidian distances calculated over parameters emanating from the LPC coefficients, pairs of spectral lines, or log area ratios, for example.

As regards the energy stationarity character of the excitation signal, the absence of linearity of the sensitivity of the human hearing system is exploited in the gain quantizers used in the coders. For this reason, the coding procedure described earlier preferably compares the energy of the excitation of the current frame Ec with the reference energy Er on the basis of the quantization indices of these energies. In order to simplify the routine, the quantizer used is that serving in the calculation of the coded energy in the SID frames.

The procedure for estimating the LPC filter and for estimating the excitation energy for the SID silence descriptor frames will be described later in the description, in the context of a particular embodiment of a corresponding comfort noise generating device.

As regards the calculation of the excitation signals, the process which is the subject of the present invention requiring to generate an excitation signal whose spectrum has characteristics similar to those of white noise and whose mean energy is that transmitted to the decoder, a simple method of synthesizing this excitation signal can consist in randomly drawing a signal of uniform probability density and given amplitude, calculated from the energy transmitted for example.

Another method can consist in synthesizing by random drawing an excitation of the same type as that used for the speech coder, the advantage of this second method lying in the possibility of constructing a module external to the decoder in the receiving part. On the other hand, from a perceptual point of view, the risk of a break with the preceding decoded frames is smaller since the excitation does not change type abruptly. An original embodiment of the second aforesaid method will be described later in the description in the context of a particular embodiment of a corresponding device.

A more detailed description of a device for creating comfort noise in a system for the digital transmission of discontinuous speech in accordance with the subject of the present invention, this device of course implementing the process for creating such comfort noise, as mentioned earlier in the description, will now be given in connection with FIG. 2e.

Figure 2E:
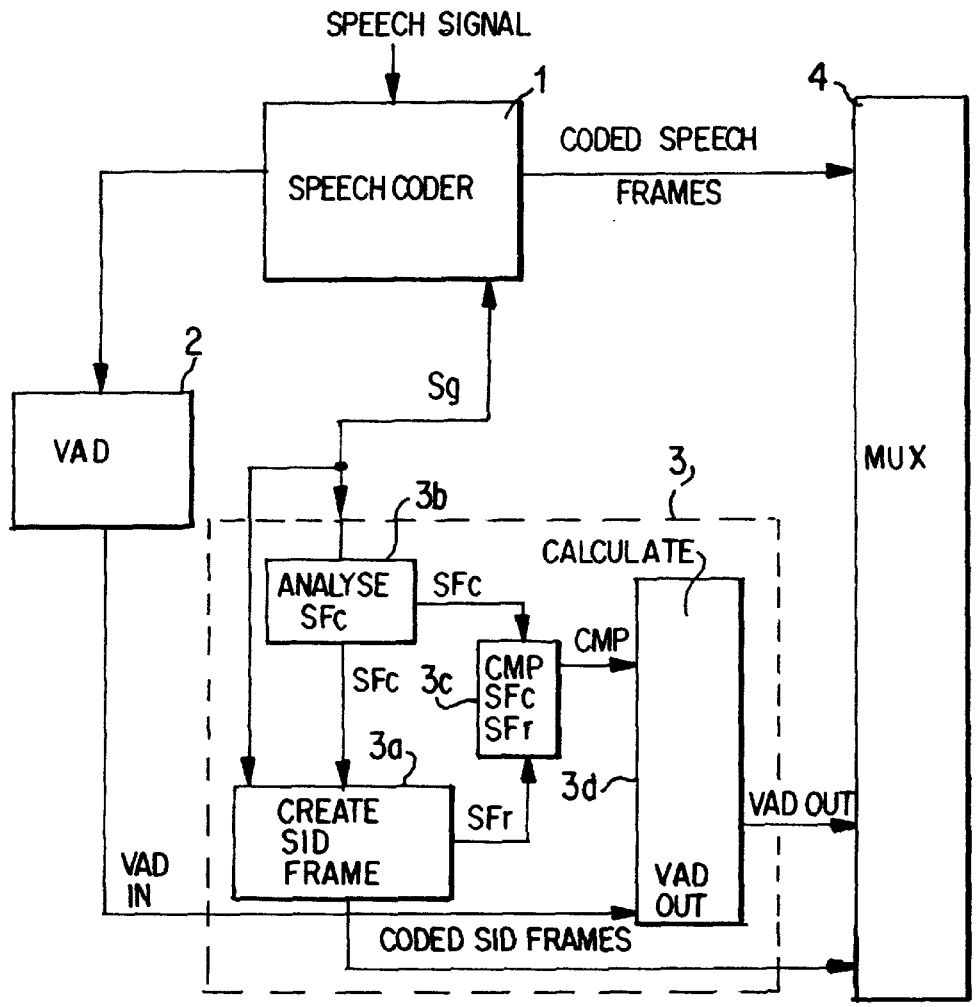
FIG. 2e represents, illustratively, in the form of functional blocks, the diagram of a device for creating at the sending end comfort noise, in accordance with the subject of the present invention.

Thus, as represented in FIG. 2e in particular, the aforesaid device comprises, associated with a speech coder bearing the reference 1, a module 2 for detecting the end of each active period during a detection period following each active period. It is understood for example that the module 2 can consist of a voice activity detector of conventional type, interconnected with the speech coder 1 and delivering a logic signal, denoted VADin representing the presence of a period of activity during which coded speech frames are transmitted, respectively of a period of absence of activity during which silence descriptor frames are to be transmitted, or on the contrary no frame is transmitted.

Furthermore, as represented in the same FIG. 2e, a CNG generator bearing the reference 3 is associated, on the one hand, with the speech coder 1, and on the other hand, with the voice activity module 2. A multiplexor 4 receives, on the one hand, the coded speech frames delivered by the speech coder 1 and the signals consisting of the coded silence descriptor frames or SID frames delivered by the CNG generator 3, respectively a signal representing the type of transmission to be effected delivered by this same CNG generator 3, and bearing the reference VADout.

In general, it is indicated that the device which is the subject of the present invention such as represented in FIG. 2e, reuses the principles of the procedure described in connection with the process according to the invention. The CNG generator 3 comprises a module 3a for creating and conditionally transmitting, during the inactivity periods, a silence descriptor frame, consisting of a set of coded parameters describing the comfort noise, a module 3b for analyzing and storing the frequency spectrum of every current inactive frame, a module 3c for comparing the frequency spectrum of the current inactive frame with a reference frequency spectrum delivering a specified command signal upon criterion of identity and of absence of identity of the reference and current frame frequency spectra, a module 3d for estimating the transmission type for the current frame delivering for every frame a signal VADout with 3 levels coding the active frame respectively frame not transmitted and silence descriptor frame cue.

This module 3d receives, on the one hand, the signal produced by the module 2 for detecting voice activity, on the other hand, the comparison signal produced by the module 3c as indicated below. When the current frame is active, the module 3d retransmits this cue in the signal VADout. Otherwise, when the current frame is the first inactive frame of the active period, the module 3d allocates the signal VADout the value corresponding to the silence descriptor frame cue, thus permitting transmission of a new silence descriptor frame. If the current frame is an inactive frame but does not constitute the first inactive frame of an inactivity zone, the module 3c compares the frequency spectrum of the current frame with the reference frequency spectrum, and upon criterion of identity and of absence of identity of these spectra, delivers the signal CMP representing respectively the frame not transmitted and silence descriptor frame cue. In this case, the module 3d, on the basis of the signal CMP, effects the coding in the signal VADout of the transmission cue making it possible to defer any transmission upon the identity of the reference and current frame frequency spectra and to carry out the transmission of a new silence descriptor frame upon the absence of identity of these spectra.

The modules 3a and 3b exchange with the speech coder a certain number of speech coder management signals, denoted Sg: at input, these modules receive the data allowing the evaluation of the frequency spectra of the current frame, module 3b, and of a certain number of frames previous to the current frame, module 3a, at output, depending on the needs of the speech coder, the module 3a forwards as appropriate to the speech coder the signals making it possible to reupdate its memories, so as to avoid desynchronization with the speech coder located at the receiving end.

At input, the module 3a also receives the frequency spectrum of the current frame generated by the module 3b, signal $SF_c$.

A more detailed description of a device for creating comfort noise will now be given in connection with FIG. 3a in the particular advantageous case in which the speech coder 1 is a predictive speech coder, including for each speech frame an LPC analysis module of analysis order M, the analysis order being defined on the basis of the number of coefficients of the LPC filter, especially producing the (M+1) coefficients of the autocorrelation function Acf of the speech signal, the M parameters, denoted Lpc, representative of the LPC filter of the frame being coded with the aid of a predictive coding method using for each frame the parameters Lpc of the preceding frames. The predictive coding of the parameters Lpc is not necessary for the operation of the present device, but nevertheless has repercussions on the design of the latter. In the case of a coder which does not use predictive coding of the parameters Lpc, it will readily be possible to simplify the device.

The speech coder 1 computes and stores for example with the aid of analysis-by-synthesis techniques an excitation signal, denoted Exc in what follows, identical to that calculated at the decoder in order to excite the LPC synthesis filter.

Figure 3A:
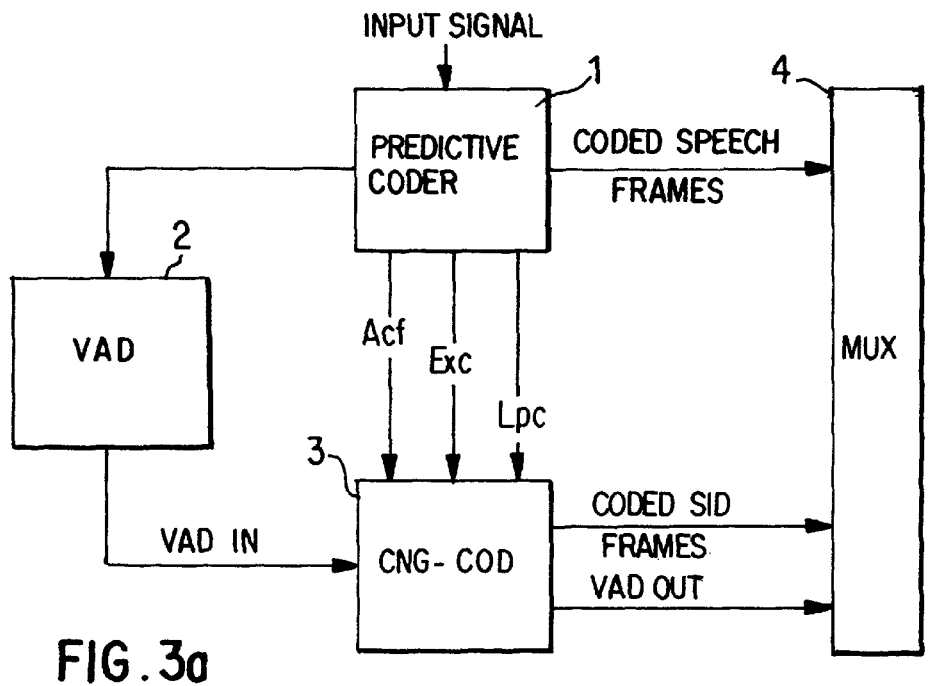
FIG. 3a represents, illustratively, in the form of functional blocks, the diagram of a device for creating at the sending end comfort noise, in accordance with the subject of the present invention, in the more specific case in which the speech coder is of predictive type.

FIG. 3a reuses the general architecture of the device represented earlier in FIG. 2e. The CNG generator 3 receives, from the speech coder 1 of predictive type, the autocorrelation function Acf of the speech signal, the parameters Lpc of the preceding frame, and, as appropriate, a certain number of samples of the excitation signal Exc(n) which partly make up the excitation signal Exc, and which emanate from the preceding frames. It is indicated that the introduction of the aforesaid samples is conditional on the use, in respect of the synthesis of the comfort noise, of the long-term excitation of the predictive coder.

A more detailed description of the CNG generator 3 implemented in accordance with the subject of the present invention will now be given in connection with FIG. 3b. This embodiment corresponds to the case in which the speech coder is a coder of predictive type.

Figure 3B:
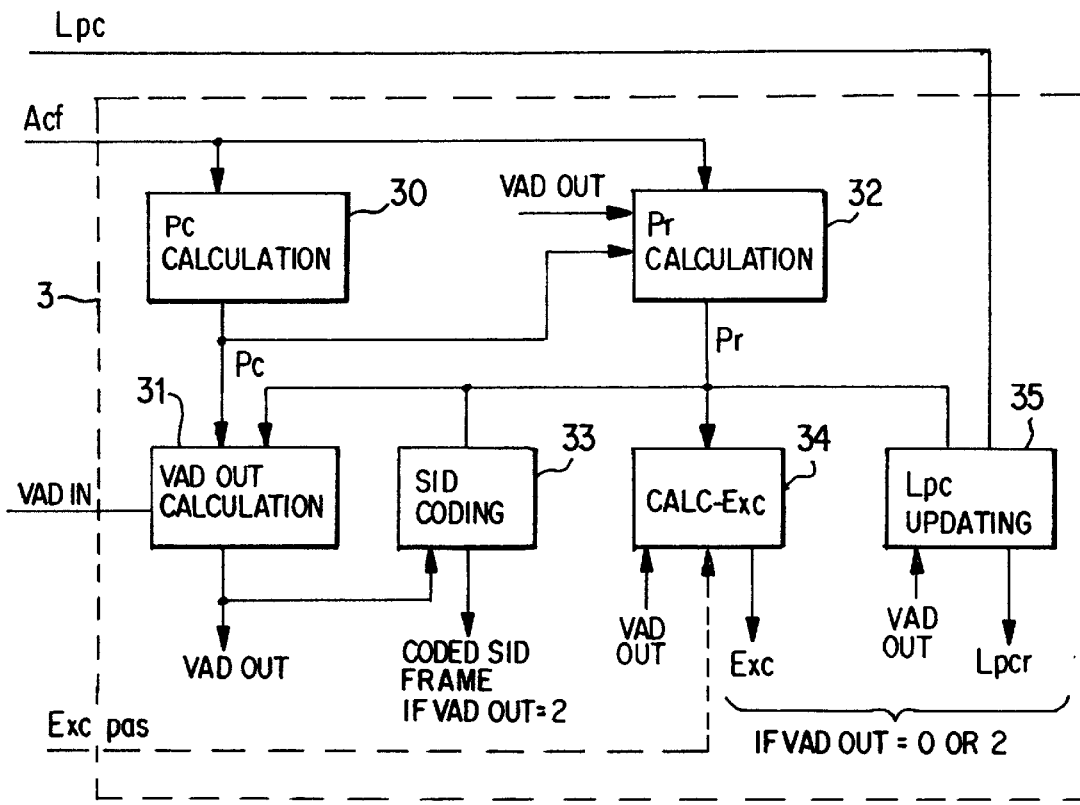

Thus, as will be observed in FIG. 3b, the device which is the subject of the present invention and in particular the CNG generator 3 include a module 30 for calculating the parameters relating to the current frame Pc, receiving the autocorrelation function signal for the speech signal Acf and producing as output the signals corresponding to the parameters of the current frame Pc. These parameters comprise the current filter Fc and the current excitation energy $E_c$.

The CNG generator 3 also comprises, as represented in FIG. 3b, a decision module 31 for sending a coded speech frame, or a silence descriptor frame, SID frame, or for suspending sending, receiving the voice activity signal VADin and the parameters relating to the current frame Pc and the reference parameters Pr delivered by a module 32 which will be described later. This module 31 delivers a transmission type signal having three levels, a signal denoted VADout, a first level VADout=0 corresponding to the total absence of sending during an inactive current frame, that is to say for the signal VADin=0, a signal delivered by the voice activity detection module 2, a second level VADout=1 corresponding to the sending of a coded speech frame during an active frame, that is to say for VADin=1, and a third level VADout=2 corresponding to the sending of a SID frame during an inactive frame, that is to say for VADin=0.

The CNG generator 3 also comprises a module 32 calculating conditionally on the incoming signal VADout the signals corresponding to the reference parameters Pr calculated at each SID frame. These parameters comprise the reference filter Fr and the reference excitation energy Er. This module receives as input the autocorrelation signals Acf and the parameters of the current frame Pc.

The CNG generator 3 next comprises a module 33 for generating silence descriptor frames SID in coded form, receiving the transmission type signal VADout, and the signals corresponding to the reference parameters Pr, and conditionally delivering a coded silence descriptor frame signal.

The CNG generator 3 next comprises a module 34 generating an excitation signal Exc, receiving the transmission type signal VADout, the signals corresponding to the reference parameters Pr and, as appropriate, according to the method of generation adopted, a certain number of past samples Excpas of the excitation signal which are supplied by the speech coder. This module delivers, conditionally on the signal VADout, an excitation signal for the current frame Exc.

The CNG generator 3 finally comprises a module 35 generating a signal describing the reupdated filtering parameters Lpc, receiving the transmission type signal VADout, and the signals corresponding to the reference parameters Pr, the signal delivered by the speech coder 1 and describing the parameters Lpc of the preceding frames, and reupdating, conditionally on VADout, this signal for the current frame, Lpcr.

The operation of the CNG generator module 3 is as follows:

at input, the CNG generator module 3 receives the cue VADin inactive frame 0, active frame 1, delivered by the voice activity detector module 2. It also receives from the speech coder module 1 and for each frame:

the autocorrelation function signal for the speech signal of the current frame Acf, the signal describing the parameters Lpc relating at least to the preceding frame, this signal being referenced Lpc and corresponding to the parameters Lpc of at least the preceding frame of the coder 1, which parameters are used by the predictive quantizer, of the speech coder, as appropriate the past excitation signal.

The CNG generator module 3 produces at output, for each frame, the previously mentioned three-level transmission type signal VADout.

For the silence descriptor frames SID, the CNG generator 3 furthermore produces the coded parameters for inserting silence which make up the SID frames.

For the inactive frames, that is to say those for which the activity signal delivered by the voice activity module 2, VADin, is equal to 0, the CNG generator module 3 additionally delivers, as appropriate, an excitation signal for the current frame Exc, and the signal Lpcr for the reupdated parameters Lpc.

The overall operation of the CNG generator 3 can be summarized as follows:

if the signal VADin is equal to 1, the frame is active and the CNG generator 3 merely passes on this cue in VADout=1;

otherwise, the module 30 firstly evaluates the parameters relating to the current frame Pc.

Next, the module 31 decides whether the current frame is not to be transmitted or constitute a SID frame to be transmitted:

if the current frame is the first inactive frame after an activity period, this is then a SID frame, otherwise, the module 31 uses the reference parameters Pr generated by the module 32 for calculating the reference parameters at the preceding SID frame and establishes whether the current frame is a SID frame.

If the current frame is an SID frame, then VADout=2, otherwise VADout=0.

If the current frame is an SID frame, the module 33 codes the parameters of the SID frame.

In both the above cases, that is to say for VADout=0 or 2, the module 34 generates, then updates the excitation signal relating to the current frame Exc, and the module 35 updates the signal representative of the parameters Lpc.

A more detailed description of the mode of working of the decision module 31 for sending a coded speech frame, or a silence descriptor frame, SID frame, or for suspending sending, will now be given in connection with FIG. 3c.

A test 1020 on the signal VADin relating to the preceding frame, indexed t−1, to determine whether the current frame is the first inactive frame, i.e. VADin(t−1)=1 for VADin(t)=0, gives rise at 1021 to the creation of a signal VADout=2, that is to say the decision to transmit an SID frame.

On the contrary, upon negative response to the test 1020, i.e. when VADin(t−1)=0, the preceding frame being inactive, the LPC filter relating to the current frame is calculated in step 1022 from the relation (3):

$$A_t(z) = \sum_{i=0}^{M} a_t(i)z^{-i}, a_t(0) = 1$$

In this relation, it is indicated that the coefficients $a_t(i)$ designate the coefficients of the LPC filter which are calculated from the previously mentioned autocorrelation coefficients of the autocorrelation signal Acf, i designating the index of each coefficient.

The value of this filter is compared with a reference filter with transfer function $A_{ref}(z)$ stored during the preceding SID frame, as described earlier in the description in relation to the implementation of the process according to the invention. This comparison can be performed with the aid of the aforesaid Itakura-Saito distance. This distance is compared with a threshold value, this making it possible to avoid the need for calculating a logarithm and to eliminate any division operation, comparison with the threshold value being carried out according to the relation (4) below:

$$\sum_{i=0}^{M} R_{Aref}(i) \times Acf_t(i) > Err_t \times \text{threshold1}$$

In the aforesaid relation, $Err_t$ denotes the LPC residual energy for the current frame, the sum of the squares of the LPC residual signal, this residual energy being obtainable in the routine for calculating the filter by the Levinson/Durbin method, $R_{Aref}$ denotes a function derived from the autocorrelation of the coefficients of the reference filter $A_{ref}(z)$ satisfying the relation (5):

$$\begin{cases} R_{Aref}(0) = \sum_{i=0}^{M} A_{ref}(i)^2 \\ R_{Aref}(i) = 2 \sum_{j=0}^{M-i} A_{ref}(j) \times A_{ref}(j+i), i = 1 \to M \end{cases}$$

When the inequality in relation (4) is satisfied, the LPC filter is not regarded as similar to the reference filter, the current frame is then defined as a new SID frame, VADout=2.

Figure 3C:
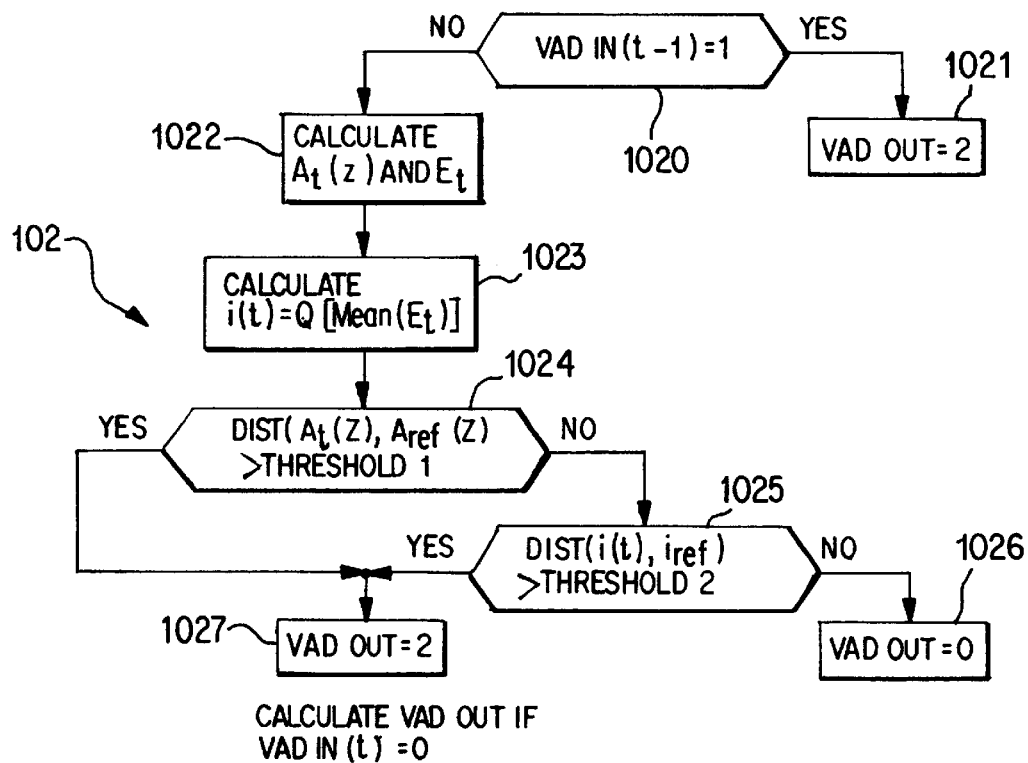
FIG. 3c represents, in the form of a functional flowchart, the set of successive steps allowing generation of a send or non-send command signal for a silence descriptor frame.

Otherwise: in the same step 1022, an operation of estimating the energy of the excitation of the current frame $E_t$ is performed on the basis of the LPC residual energy $Err_t$. In order to undertake the estimation of the current excitation energy $E_t$, the LPC residual energy $Err_t$ is multiplied by a factor denoted CE estimated by learning. The mean of these energies is then calculated over m frames, m being for example an integer corresponding to a time interval of 100 to 200 ms, and a quantization operation is undertaken, denoted Q(.), according to the relation (6):

$$i(t) = Q\left(\frac{1}{m} \sum_{j=t-m+1}^{t} E_j\right)$$

in which i(t) denotes the quantization index of the mean energy of the m consecutive frames comprising the current frame, this operation being carried out in a step 1023 in FIG. 3c.

It is indicated that the aforesaid number m of frames is initialized to 1 at the start of each inactive zone, and it can then be incremented with each frame up to a specified maximum value.

The aforesaid operation 1023 is then followed by an operation 1024 consisting in comparing the LPC filter of the current frame and the reference filter $A_{ref}(z)$ as mentioned earlier. Upon positive response to the aforesaid test 1024, the signal VADout is set to 2 in step 1027 thus permitting the transmission of an SID frame. Upon negative response to the test 1024, a test 1025 is then performed, this test 1025 consisting in a test on the quantized values of the mean of the energies obtained in the preceding relation (6), the quantization index for the current frame i(t) being compared with that of the reference frame obtained during the preceding SID frame, denoted $i_{ref}$ according to the relation (7):

$$|i(t)-i_{ref}|>threshold2.$$

Upon positive response to the test 1025, the inequality being satisfied, the energy level of the excitation has changed and the current frame is then defined as SID frame.

Upon negative response to the test 1025, the current frame is defined as a nontransmitted silence frame 1026, the signal VADout being equal to 0.

Figure 3D:
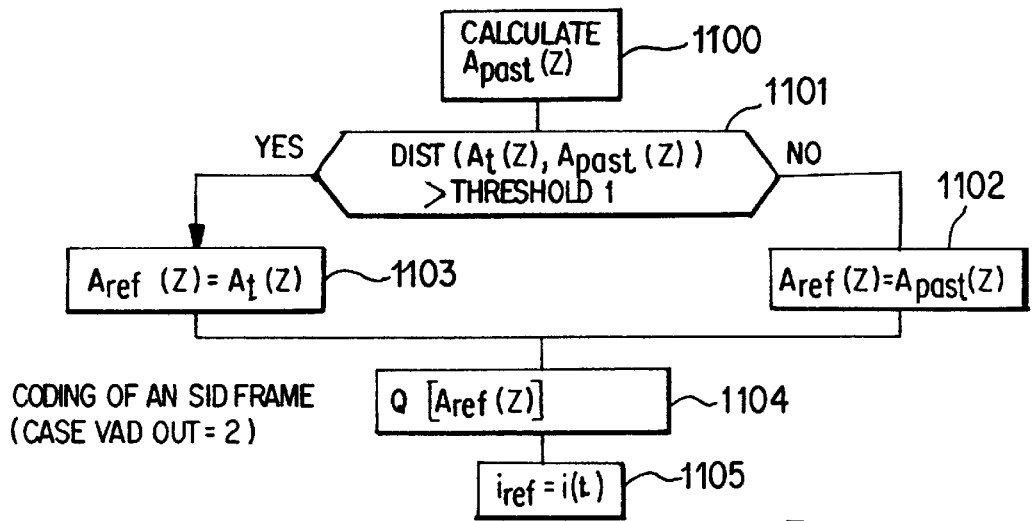
FIG. 3d represents, in the form of a functional flowchart, the set of successive steps allowing the creation, coding and transmitting of an silence descriptor frame.

A more detailed description of the mode of working of the silence descriptor frame, coded SID frame, generator module 31 will now be given in connection with FIG. 3d.

Generally, it is indicated that when coding an SID frame, a new reference filter $A_{ref}(z)$ is calculated.

Firstly, and in order to carry out this operation, a past mean LPC filter, whose transfer function is denoted $A_{past}(z)$ is evaluated in step 1100 according to the relation (8):

$$A_{past}(z) = \underset{j = t - p1 \to t - 1}{\text{Mean}} (A_j(z))$$

This filter is calculated from the sum of the signal autocorrelations, denoted Acf earlier, of the $p_1$ frames preceding the current frame. An autocorrelation calculation $R_{Apast}$ of the coefficients of this filter is then carried out in accordance with the method given by the aforesaid relation (5).

A local stationarity measurement test is performed at 1101 in a manner similar to the test 1024 described in connection with FIG. 3c, in accordance with relation (2) mentioned earlier. The threshold value for the test 1101 is a particular value equal to threshold1. Upon positive response to the aforesaid test 1101, the step 1103 makes it possible to select the current filter as reference filter according to the relation $A_{ref}(z)=A_t(z)$ and the new autocorrelation function of the reference filter $R_{Aref}$ is then calculated.

Upon negative response to the test 1101, the past mean filter is selected as reference filter according to the relation $A_{ref}(z)=A_{past}(z)$ and the autocorrelation function of the coefficients of the reference filter is reupdated according to the relation (9):

$$R_{Aref}(i)=R_{Apast}(i), i=0 \to M.$$

A quantization step 1104 is then performed on the parameters representing the previously selected reference filter 1104, the quantization operation being carried out according to the routine used by the coder, the code thus obtained being inserted into the coded SID frame.

In a step 1105, the excitation energy already calculated and quantized at 1023 i(t) is inserted into the corresponding SID frame and stored as reference energy $i_{ref}$.

As regards the synthesis of the excitation signal, it is indicated that $i_{ref}$ denoting the quantization index of the reference energy, $g_{ref}$ denotes the restored gain equal to the square root of the mean energy per sample, obtained through the relation:

$$g_{ref} = \sqrt{Q^{-1}(i_{ref})}$$

where $Q^{-1}$ represents the inverse quantization operation.

The gain $g_t$ of the current frame is then given by:

$g_t=g_{ref}$ at the start of an inactive period, $g_t=\alpha \times g_{t-1}+(1-\alpha) \times g_{ref}$ during an inactive period.

In this relation, $\alpha$ is a real coefficient lying between 0 and 1.

In a first method mentioned earlier in the description in relation to the implementation of the process which is the subject of the present invention, the synthesis of the excitation signal can be carried out by random drawing of samples. In this case, it is indicated that the drawing of N excitation samples of a frame can be performed in the interval $[-g_t \times \sqrt{3}, g_t \times \sqrt{3}]$ by means of a random generator of uniform law.

A second method of synthesizing the excitation signal consists in randomly drawing the codes of the parameters characterizing the excitation signal Exc and in supplying these codes directly to the decoder. This method has the advantage of allowing autonomous installation of the comfort noise generator at the decoder, and avoids any possible discontinuities in the excitation signal when toggling between the active frames and the comfort noise. The codes of the parameters of the excitation will have to be adjusted so that the energy of the excitation decoded for the current frame corresponds to the desired energy, namely $Ng_t^2$, $g_t^2$ corresponding to the mean energy per sample and $Ng_t^2$ denoting the energy to be obtained for the N samples making up this frame. Simplest, when the speech coders use long-term prediction, or equivalently an adaptive dictionary using the samples of the past excitation, is to suppress this excitation by selecting the smallest quantized gain of the LTP excitation, the long-term prediction excitation, which gain is generally zero or near zero. The excitation produced is then virtually reduced to the innovation whose energy is easily controlled. However, for many speech coders, suppression of the long-term excitation produces a spectrally poor excitation whose characteristics are not those of white noise and the quality of the comfort noise synthesized by the decoder is affected thereby.

Figure 3E:
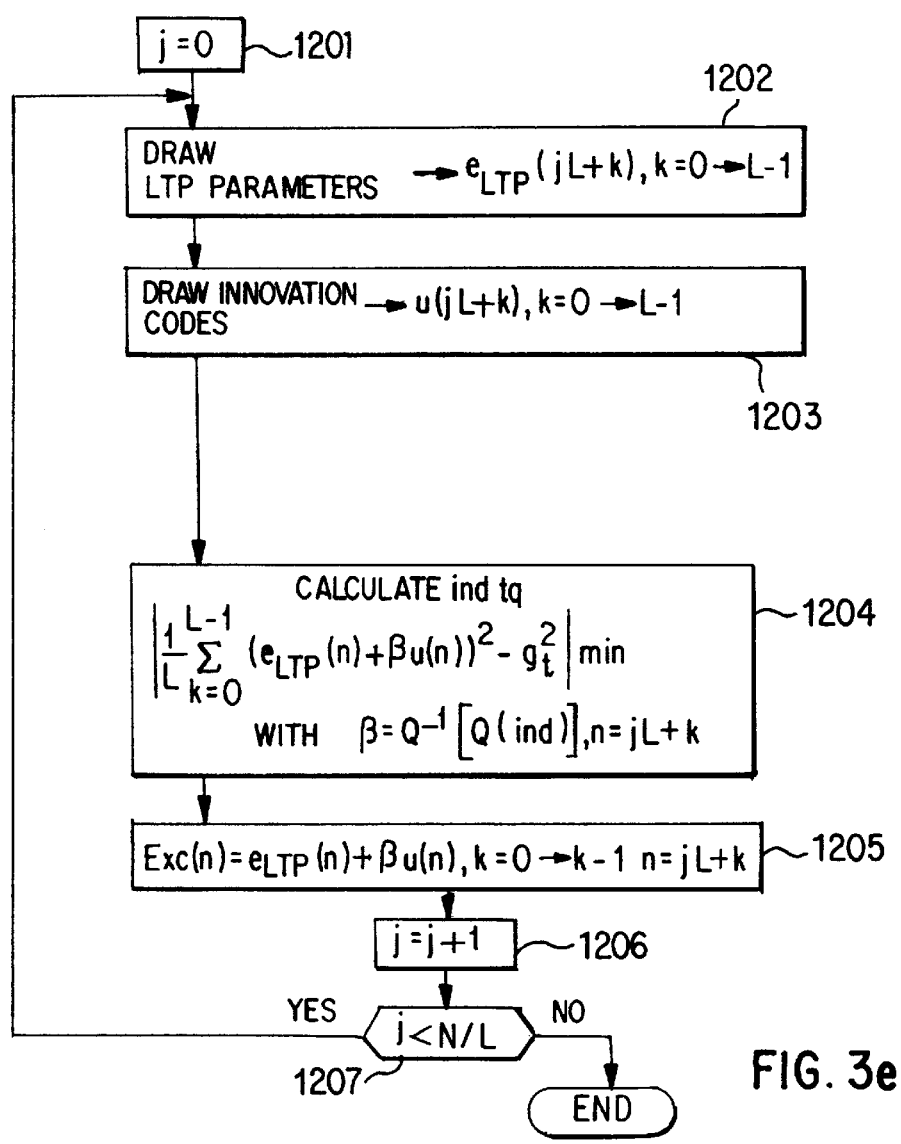
FIG. 3e represents, in the form of a functional flowchart, the set of successive steps allowing the generation of an excitation signal according to a preferred embodiment.

A particularly advantageous method making it possible to use the LTP excitation and to control the gain of the overall excitation obtained by addition of the LTP excitation and of an innovation is now described, in connection with FIG. 3e.

Let us firstly note that, according to this method, the speech coder must forward to the CNG module 3 a certain number of samples of the excitation signal Excpas which emanate from past frames, which signal is represented as a dashed line in FIG. 3b.

In this embodiment, the frame of N samples is divided into N/L blocks of L samples over which the parameters of the excitation are calculated and coded. Depending on the needs of the speech coder, these blocks may be subdivided, the period of calculation of the codes of the long-term excitation not necessarily corresponding to that of the innovation.

In FIG. 3e, step 1201 makes it possible to initialize to 0 the counting variable j relating to the completeness of a block of N/L samples.

The excitation signal Exc consisting of the samples Exc (n) with n=0 to N−1 is defined for the current frame as the linear combination of a long-term prediction excitation, denoted $e_{LTP}(n)$, and an innovative excitation, denoted $\beta$ u(n), u(n) denoting the innovative waveform and $\beta$ its gain after dequantization, which gain it is sought to adjust, for each block, in such a way as to control the excitation energy thus produced.

For each block of index j, the codes of the parameters of the long-term excitation are drawn randomly, in a step 1202. A constraint is preferable on the code of the gain of the long-term excitation in order to limit the energy of the latter. L samples of the signal $e_{LTP}(n)$ are thus obtained, with n=jL+k, k varying from 0 to L−1, over the block, by using the samples of the past signal Excpas supplied by the speech coder.

The innovation excitation signal is next obtained, in a step 1203, by randomly drawing the code of the innovation waveform. The L samples of the waveform u(n) are then obtained, with n=jL+k, k varying from 0 to L−1, over the block.

Step 1204 makes it possible to search for the quantization index ind of the gain of the innovation excitation, and therefore, via the dequantization operation, the associated gain β. The index making it possible to obtain over the block the per-sample mean energy which is as close as possible to the desired value $g_t^2$ will be selected according to the relation (10):

$$\left| \frac{1}{L} \sum_{n=jL}^{(j+1)L-1} (e_{LTP}(n) + \beta u(n))^2 - g_t^2 \right| \text{minimum}$$

the gain β running through the set of restoration values of the quantizer of gains of the excitation of the innovation.

A variant of the present method, in the case in which the gains of the long-term excitation and of the innovation excitation are quantized jointly by a vector quantizer, is as follows: in step 1202, the excitation $e_{LTP}(n)$ is obtained by randomly drawing the codes representing the LTP lag, for a gain equal to 1. Relation (10) is then modified into (11):

$$\left| \frac{1}{L} \sum_{n=jL}^{(j+1)L-1} (\beta_1 e_{LTP}(n) + \beta_2 u(n))^2 - g_t^2 \right| \text{minimum}$$

the dequantized gains $\beta_1, \beta_2$ being selected jointly by exploring the dictionary of the vector quantizer.

Step 1204 is followed by a step 1205 in which the excitation signal Exc is updated by calculating Exc for the samples of the current block. Incrementation of the counting variable j, in a stop 1206 followed by a test of the value of this variable, at 1207, make it possible to complete the obtaining of the excitation signal for the set of samples making up a frame.

A more detailed description of the device generating comfort noise in a system for the digital transmission of discontinuous speech, at the receiving end, will now be given in connection with FIGS. 4a and 4b.

Figure 4A:
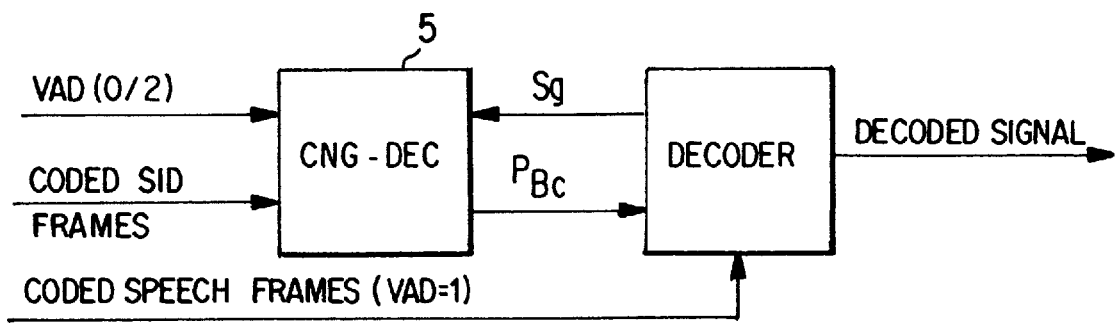
FIG. 4a represents, in the form of functional blocks, a diagram of the device for creating, at the receiving end, comfort noise, in accordance with the subject of the present invention.
Figure 4B:
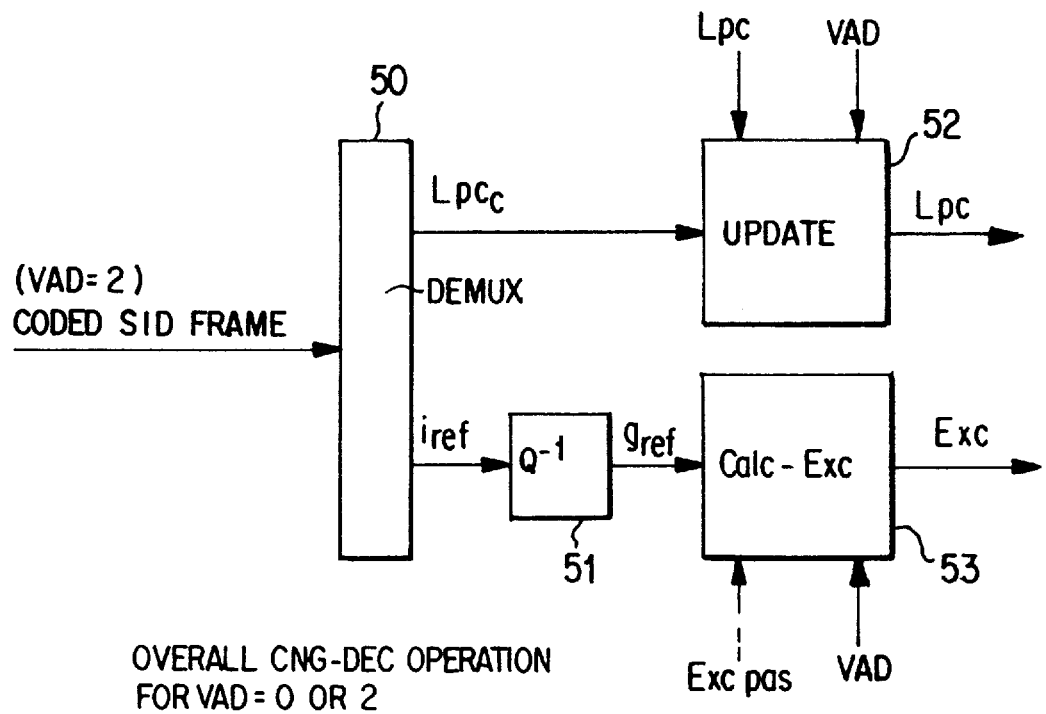

Thus, as represented in FIG. 4a, it is indicated that the device at the receiving end comprises a module 5 for decoding the comfort noise or, more particularly, in each successive silence descriptor frame, the set of coded parameters describing this comfort noise.

The module 5 is associated with the speech decoder proper and it receives the cue relating to the type of current frame processed by this module 5, which cue is denoted VAD, this cue reproducing the cue of the three-level signal VADout generated at the sending end, as well of course as the coded silence descriptor frames or SID frames. It furthermore receives from the speech decoder a management signal Sg ensuring synchronization with the decoder.

The module 5 makes it possible to generate parameters describing the comfort noise PBc which relate to the current frame.

The speech signal decoder receives, on the one hand, the coded speech frames and, on the other hand, the signal describing the parameters of the comfort noise PBc relating to the current frame. It delivers by synthesis a synthesized speech signal, designated by the term decoded signal, in the aforesaid figure.

The module 5 represented in FIG. 4a will now be described in more detail in FIG. 4b in the case in which the speech signal decoder is formed by a predictive decoder. The decoding module 5 includes, at least, one demultiplexor 50 receiving the transmitted coded silence descriptor frame signal and delivering a coded signal describing the LPC filtering parameters, this signal relating to the current frame being denoted $Lpc_c$ in FIG. 4b, as well as a quantized gain index signal $i_{ref}$ describing the level of the synthesized excitation signal. These parameters are used until the next SID frame.

Furthermore, a dequantizer module 51 is provided, which receives the aforesaid quantized gain index signal and delivers a dequantized gain signal denoted $g_{ref}$.

A calculation module 52 is provided, which receives the coded signal, relating to the current frame and denoted $Lpc_c$, describing the LPC filtering parameters, the signal denoted Lpc describing the LPC filtering parameters and relating at least to the preceding frame, and the frame transmission type cue, denoted VAD. The calculation module 52 then delivers the updated LPC signal together with the LPC parameters of the current frame.

Finally, an excitation generator module 53 is provided, which receives the dequantized gain signal $g_{ref}$, if appropriate the past excitation signal and the frame type cue VAD, and delivers the excitation signal relating to the current frame Exc.

The decoder module 5 operates only when the frames are not active.

At input, it receives the cue given by the signal VAD 0: nontransmitted frame, 2: SID frame and, in the case of an SID frame, the coded parameters of the frame. The speech decoder supplies on the other hand the following data:

the LPC parameters relating at least to the preceding frame which are used by the predictive quantizer, the signal relating to these LPC parameters of the preceding frame being denoted Lpc;

the past excitation signal Excpas, a memory store of the long-term predictor.

At output, the decoding module 5 produces for each inactive frame the N new samples of the excitation signal Exc and new LPC parameters after dequantization, denoted Lpc.

The speech decoder uses these data to carry out the synthesis of the inactive frames.

When the signal VAD=2, the parameters of the SID frame, $Lpc_c$ and $i_{ref}$ for the quantized energy are decoded and stored. The parameters stored in this step will be denoted $Lpc_{ref}$ and $g_{ref}$.

When VAD=0, the calculation module 52 calculates a new set of LPC parameters by quantizing and dequantizing $Lpc_{ref}$ by using the past parameters Lpc supplied by the decoder, the dequantized gain $g_{ref}$ not changing and the gain relating to the current frame $g_t$ being updated according to the relation mentioned earlier in the description.

In both cases, the module 53 calculates the new excitation Exc relating to the current frame, according to one or other of the methods described earlier in the description, and transmits it to the speech decoder, which performs the synthesis of the decoded signal of the inactive frames.

It will be noted that the comfort noise decoder module 5 can be rendered totally autonomous and installed in a manner external to the decoder. In this case, the procedures used are the same via a transfer of certain elementary functions of the decoder into this module.

Finally, in a particular embodiment, the preferred values of the parameters mentioned earlier in the description were the following, for a frame N=240 samples sampled at a frequency of 8 kHz:

| Parameter  | Use                              | Value |
|------------|----------------------------------|-------|
| $p_1$      | number of frames/mean filter     | 3     |
| $p_2$      | number of frames/average energies| 3     |
| threshold1 | spectral stationarity threshold  | 0.07  |
| threshold2 | energy stationarity threshold    | 3     |
| $C_E$      | $Err_t$ correction factor        | 2.70  |

The correction factor $C_E$ and the above values were adapted for the G 723 predictive coder standardized by the ITU, a predictive type coder for STN video telephony.

A high-performance process and device for creating comfort noise in a system for the digital transmission of discontinuous speech have thus been described.

The process and the device which are the subjects of the present invention are particularly advantageous insofar as, being based on an analysis of the signal in the course of the inactive periods, a procedure for refreshing the parameters used to reproduce the noise when the characteristics of the latter have changed is carried out. The dispatching of SID frames is not limited to the first inactive frame, neither is it reproduced periodically, but commanded by the device itself, thus making it possible to ensure good quality of comfort noise while minimizing the volume of data to be transmitted.

They are noteworthy in that in order to estimate parameters making it possible to form the SID frames, they implement an effective method which takes into account the stationarity or nonstationarity of the ambient noise, restoring the alterations in the latter.

In the more particular case of a device associated with a predictive type speech coder, for the purpose of estimating energy stationarity, the process which is the subject of the present invention makes a comparison of the energies of the quantized excitation signal, thus making it possible to benefit in a simple manner from the perceptual properties of the quantizer.

Finally, in the case of the implementation of the second method for synthesizing the excitatory wave, the process which is the subject of the present invention proposes a means for using an LTP adaptive dictionary in addition to the innovation dictionary, a method which makes it possible to adjust the gain to the energy transmitted being developed. The excitatory waveforms thus created in general possess greater spectral richness than that using only the innovation dictionaries.

Finally, the whole allows the implementation and creation of good quality noise, which is synthesized even when the mean transmission rate is low, and at the cost of moderate comlexity of calculation.

I claim:

1. A process for creating comfort noise in a system for the digital transmission of discontinuous speech, in which the coded speech signal is transmitted during an active period, during which active frames are transmitted, each active period being followed by an inactive period, during which at least inactive frames are transmitted, wherein said process consists, at the sending end, on detecting an inactive period, in:

generating and transmitting a silence descriptor frame, consisting of a set of coded parameters describing the comfort noise, said silence descriptor frame constituting a first silence descriptor frame of said inactive period following said active period; and for every successive current inactive frame of said inactive period:

analysing and storing the frequency spectrum of said current inactive frame;

comparing the frequency spectrum of said current inactive frame with a reference frequency spectrum, and upon criterion of identity of the reference and current inactive frame frequency spectra:

deferring any transmission, especially that of a new silence descriptor frame during said current inactive frame, and upon criterion of absence of identity of said reference and current inactive frame frequency spectra:

generating and transmitting a new silence descriptor frame during said current inactive frame, thereby allowing to reduce the transmission rate of the comfort noise to that of merely the silence descriptor frames whose frequency spectrum is different from said reference spectrum estimated during the preceding silence descriptor frame.

2. The process of claim 1, wherein the reference frequency spectrum is formed from the frequency spectrum of the ambient noise estimated and stored during the creation of each silence descriptor frame.

3. The process for creating comfort noise in a system for the digital transmission of discontinuous speech, in which the speech signal is transmitted during an active period, during which active frames are transmitted, each active period being followed by an inactive period, during which at least inactive frames are transmitted, silence descriptor frames being transmitted at the sending end according to claim 1, wherein said process consists, at the receiving end, in conjunction with a speech decoder, in:

decoding, for each successive silence descriptor frame, a set of coded parameters describing the comfort noise, in order to generate decoded parameters;

synthesizing, at the level of said speech decoder, after processing said decoded parameters, the corresponding comfort noise.

4. A process for synthesizing an excitation signal used in a comfort noise generator in a system for the digital transmission of discontinuous speech comprising a speech coder of predictive type, based on a specified number of excitation samples emanating from past frames and from long-term prediction data LTP delivered by this speech coder, wherein said process consists:

in subdividing each current inactive frame, including N samples, into N/L blocks each including N/L successive samples;

in randomly drawing the codes of the parameters of the long-term excitation, by using said excitation samples emanating from past frames, in order to obtain L long-term prediction excitation samples $e_{LTP}(n)$;

in randomly drawing codes of an innovation waveform, in order to obtain L samples u(n) of said waveform;

in determining a gain value β from the quantization index of said gain;

in determining, by updating the samples of each current block, an excitation signal Exc, said excitation signal being defined for said current frame as a linear combination, based on the gain value β, of the long-term excitation $e_{LTP}(n)$ and of said innovation waveform u(n).

5. The process of claim 4, wherein the value of the gain β is associated with said innovation waveform, said gain value being obtained by selecting the quantization index allowing to obtain, over said current block, the per-sample mean energy which is as close as possible to a desired value $g_t^2$, upon a criterion of minimizing the expression:

$$\left| \frac{1}{L} \sum_{n=jL}^{(j+1)L-1} (e_{LTP}(n) + \beta u(n))^2 - g_t^2 \right| \text{minimum}$$

said linear combination defining the excitation signal Exc satisfying the relation:

$$Exc(jL+k) = e_{LTP}(jL+k) + \beta u(jL+k)$$

with n=jL+k and k varying from 0 to L−1.

6. The process of claim 4, wherein said gain value β is associated with said long-term excitation and with said innovation waveform, by weighting on the basis of respectively associated gain values, $β_1$, $β_2$, said gain values being obtained by selecting a quantization index allowing to obtain, over said current block, a per-sample mean energy value which is as close as possible to a given value $g_t^2$, upon a criterion of minimizing the expression:

$$\left| \frac{1}{L} \sum_{n=jL}^{(j+1)L-1} (\beta_1 e_{LTP}(n) + \beta_2 u(n))^2 - g_t^2 \right| \text{minimum}$$

said linear combination defining an excitation signal Exc satisfying the relation:

$$Exc(jL+k) = \beta_1 \cdot e_{LTP}(jL+k) + \beta_2 \cdot u(jL+k)$$

with n=jL+k and k varying from 0 to L−1.

7. A device for creating comfort noise in a system for the digital transmission of discontinuous speech, in which the speech signal is transmitted during an active period, during which active frames are transmitted, each active period being followed by an inactive period, during which at least inactive frames are transmitted, said device including, at the sending end, constituting a comfort noise generator:

means for creating and conditionally transmitting, upon detecting an inactive period, a silence descriptor frame, consisting of a set of coded parameters describing the comfort noise, said silence descriptor frame constituting a first silence descriptor frame of said inactive period following said active period;

means for analysing and storing the frequency spectrum of every successive current inactive frame of said inactive period;

means for comparing the frequency spectrum of said current inactive frame with a reference frequency spectrum delivering a specified command signal upon criterion of identity and of absence of identity of said reference and current frame frequency spectra;

means for controlling the disabling and enabling respectively of the transmission of a new silence descriptor frame during said current inactive frame, receiving said specified command signal delivered by said comparing means, so as to defer any transmission especially that of a new silence descriptor frame upon the identity of said reference and current frame frequency spectra, and to carry out the transmission of a new silence descriptor frame upon the absence of identity of said reference and current frame frequency spectra, the rate of transmission of the comfort noise thus being reduced to that of merely the silence descriptor frames whose frequency spectrum is different from the reference spectrum estimated during a preceding silence descriptor frame.

8. The device of claim 7, wherein the digital transmission system including, at the sending end, a voice activity device delivering a voice activity signal, a predictive speech coder, said coder performing an analysis of the speech signal by means of an LPC filter delivering an autocorrelation function signal for the speech signal, a signal describing the LPC filtering parameters relating to the preceding frame, and, conditionally, an excitation signal of at least one preceding frame, said device further comprises, constituting the comfort noise generator:

a module for calculating parameters relating to the current frame receiving the autocorrelation function signal for the speech signal and producing signals corresponding to the parameters of a current frame;

a decision module for sending a frame of coded speech frame, a silence descriptor frame or for suspending sending, said decision module receiving said voice activity signal and said signals corresponding to the parameters of said current frame and to the reference parameters and delivering a frame transmission type signal having three levels, a first level corresponding to the total absence of sending during an inactive current frame, a second level corresponding to the sending of a coded speech frame during an active frame, and a third level corresponding to the sending of a silence descriptor frame during an inactive frame;

a module for the conditional calculation of reference parameters, said module receiving as input the autocorrelation function signal for the speech signal and said signals corresponding to the parameters of said current frame, and delivering a reference parameters signal;

a coded silence descriptor frame generator module receiving said transmission type signal, said signals corresponding to the reference parameters and conditionally delivering a coded silence descriptor frame signal;

a module generating an excitation signal receiving the transmission type signal, and, conditionally, the past excitation signal supplied by said speech coder and delivering conditionally on the frame transmission type signal an excitation signal for said current frame;

a module generating a signal describing the updated LPC filtering parameters, receiving said frame transmission type signal, a signal describing the LPC parameters of the preceding frames which is delivered by said speech coder, and delivering conditionally on said frame transmission type signal a signal describing the updated LPC parameters for said current frame.

9. A process for creating a silence descriptor frame in order to generate comfort noise in a system for the transmission of discontinuous speech in which the coded speech signal is transmitted during an active period, said transmission consisting thus of successive active periods during which coded speech signal frames are transmitted, interspersed with inactive periods during which no speech signal frame is transmitted, said inactive periods consisting thus of inactive frames, including at least one silence descriptor frame forming an initial one of said inactive frames and successive inactive frames preceding a current inactive frame, for which transmission of a new silence descriptor frame can take place, wherein, in order to create each silence descriptor frame, said process comprises the steps of:

measuring local stationarity of a frequency spectrum of a plurality of said successive inactive frames preceding said current inactive frame;

determining a mean frequency spectrum of said successive inactive frames in order to establish a past mean frequency spectrum and upon criterion of identity and of absence of identity of a past mean frequency spectrum and of the frequency spectrum of said current inactive frame; and selecting, in order to compute said silence descriptor frame, said past mean frequency spectrum and said spectrum of said current inactive frame respectively, thereby allowing to estimate a silence spectrum for every silence descriptor frame by taking into account the fact that said current inactive frame belongs either to a locally stationary spectral zone or to a non-stationary spectral zone.

10. A device generating a comfort noise in a system for the digital transmission of discontinuous speech, in which a coded speech signal is transmitting during an active period, during which active coded speech frames are transmitted, each active period being followed by an inactive period, during which at least silence descriptor frames are transmitted at the sending end, with said silence descriptor frames being transmitted on detecting an inactive period by generating and transmitting a silence descriptor frame, consisting of a set of coded parameters describing the comfort noise, said silence descriptor frame constituting a first silence descriptor frame of said inactive period following said active period, and for every successive current inactive frame of said inactive period, analyzing and storing the frequency spectrum of said current inactive frame, comparing the frequency spectrum of said current inactive frame with a reference frequency spectrum, and upon criterion of identity of the reference and current inactive frame frequency spectra, deferring any transmission, including that of a new silence descriptor frame, during said current inactive frame, and upon criterion of absence of identity of said reference and current inactive frame frequency spectra, generating a transmitting a new silence descriptor frame during said current inactive frame, so as to reduce the transmission rate of the comfort noise to that of merely the silence descriptor frames whose frequency spectrum is different from said reference spectrum estimated during the preceding silence descriptor frame, wherein said device comprises, at a receiving end, means for decoding in each successive silence descriptor frame the set of coded parameters describing the comfort noise, said means receiving a cue relating to the type of current frame processed, a coded silence descriptor frame signal and, from a speech decoder, a management signal ensuring synchronous operation with said speech decoder, in order to generate decoded parameters including a signal describing the comfort noise relating to said current frame, said decoding means being interconnected with a speech signal decoder receiving, on the one hand, said coded speech frames, and, on the other hand, said signal describing the comfort noise relating to said current frame, said speech decoder delivering by synthesis a speech signal or a synthesized comfort noise.

11. The device of claim 10, wherein, in the case in which said speech signal decoder is formed by a predictive decoder, said decoding means include at least:

a demultiplexor receiving the transmitted coded silence descriptor frame signal and delivering a coded signal describing the LPC filtering parameters relating to the current frame and a quantized gain index signal describing the synthesized excitation signal;

a dequantizer module receiving the quantized gain index signal and delivering a dequantized gain signal;

a calculation module receiving the coded signal describing the LPC filtering parameters relating to said current frame, said signal describing the LPC filtering parameters relating at least to the preceding frame and the frame transmission type cue and delivering an updated signal with the LPC parameters relating to said current frame;

an excitation generator module receiving a dequantized gain signal, conditionally a past excitation signal and said frame transmission type cue and delivering an excitation signal relating to said current frame.

* * * * *